(12) United States Patent
Bryan

(10) Patent No.: US 11,622,065 B2
(45) Date of Patent: Apr. 4, 2023

(54) MOTORIZED OPTICAL COMPONENT INTERFACE SYSTEMS AND METHODS

(71) Applicant: FLIR Systems AB, Täby (SE)

(72) Inventor: Jacob F. Bryan, Gulf Breeze, FL (US)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 17/396,595

(22) Filed: Aug. 6, 2021

(65) Prior Publication Data
US 2023/0040359 A1    Feb. 9, 2023

(51) Int. Cl.
*H04N 5/225* (2006.01)
*H04N 5/232* (2006.01)
*H04N 5/33* (2023.01)
*G03B 17/14* (2021.01)

(52) U.S. Cl.
CPC ....... *H04N 5/2254* (2013.01); *H04N 5/23212* (2013.01); *G03B 17/14* (2013.01); *H04N 5/33* (2013.01)

(58) Field of Classification Search
CPC .... H04N 5/2254; H04N 5/23212; H04N 5/33; G03B 17/14
See application file for complete search history.

(56) References Cited

U.S. PATENT DOCUMENTS

| | | | |
|---|---|---|---|
| 9,124,790 B2* | 9/2015 | Okuda | G02B 7/10 |
| 9,645,476 B2* | 5/2017 | Hasuda | G03B 17/14 |
| 2011/0149142 A1* | 6/2011 | Yumiki | G03B 3/10 |
| | | | 348/E5.045 |
| 2013/0120646 A1* | 5/2013 | Mukai | H04N 5/2254 |
| | | | 348/360 |
| 2016/0065815 A1* | 3/2016 | Uemura | H04N 5/23296 |
| | | | 348/335 |
| 2019/0306392 A1* | 10/2019 | Imamura | H04N 5/23212 |
| 2019/0361194 A1* | 11/2019 | Nunnink | G02B 7/14 |

* cited by examiner

*Primary Examiner* — Padma Haliyur
(74) *Attorney, Agent, or Firm* — Haynes and Boone, LLP

(57) ABSTRACT

Various techniques are provided for interfacing motorized and non-motorized optical assemblies with imaging systems. In one example, a method includes receiving an optical assembly at a lens mount assembly of an imaging system. The method also includes receiving a rotation of the optical assembly from a first position to a second position to secure the optical assembly to the lens mount assembly. The rotation causes one or more electrical connections of the lens mount assembly to translate toward and engage with one or more complementary electrical connections of the optical assembly to couple an electrical component of the optical assembly with the imaging system. Additional methods and systems are also provided.

20 Claims, 15 Drawing Sheets

MOTORIZED OPTICAL COMPONENT INTERFACE SYSTEMS AND METHODS

TECHNICAL FIELD

The present invention relates generally to infrared imaging and, more particularly, to infrared imaging systems with motorized optical component interfaces.

BACKGROUND

Infrared imaging systems provide for the measurement of temperatures of rapid thermal events and fast-moving targets, making such imaging systems an ideal choice for industrial, military, and manufacturing research and design applications. These infrared imaging systems offer the flexibility of both manual and remote-focus optical component options to maximize the number of measurement pixels on the object of interest.

Unfortunately, due to the fixed nature of the optical components, such infrared imaging systems may not be easily used with other optical components, such as different lenses or filters. Indeed, attempting to some different types of optical components with older infrared imaging system interfaces may cause electrical issues, thus rendering the infrared imaging system unusable.

SUMMARY

Various techniques are disclosed to provide an optical component interface that is configured to operate with both motorized and non-motorized optical components without causing electrical issues. For example, a mechanism within a lens mount assembly of an infrared imaging system provides for extension of an optical component electrical interface when a motorized lens is utilized, while allowing the optical component electrical interface to remain in the retracted position when a non-motorized lens interface is used.

In one embodiment, a method includes receiving an optical assembly at a lens mount assembly of an imaging system; receiving a rotation of the optical assembly from a first position to a second position to secure the optical assembly to the lens mount assembly; and wherein the rotation causes one or more electrical connections of the lens mount assembly to translate toward and engage with one or more complementary electrical connections of the optical assembly to couple an electrical component of the optical assembly with the imaging system.

In another embodiment, a system includes an imaging system comprising a lens mount assembly; an optical assembly configured to be received by the lens mount assembly; wherein the optical assembly is configured to rotate from a first position to a second position to secure the optical assembly to the lens mount assembly; and wherein the rotation causes one or more electrical connections of the lens mount assembly to translate toward and engage with one or more complementary electrical connections of the optical assembly to couple an electrical component of the optical assembly with the imaging system.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, optical systems and methods are provided. In some aspects, such systems and methods may be used for infrared imaging, such as thermal infrared imaging. Such imaging (e.g., infrared imaging) may be used for various applications, such as functional safety and vehicular (e.g., automotive) applications. In one embodiment, an optical assembly is received at a lens mount assembly of an imaging system. When a user rotates the optical assembly from a first position to a second position to secure the optical assembly to the lens mount assembly, the rotation causes one or more electrical connections of the lens mount assembly to translate toward and engage with one or more complementary electrical connections of the optical assembly to couple an electrical component of the optical assembly with the imaging system.

Figure 1A:
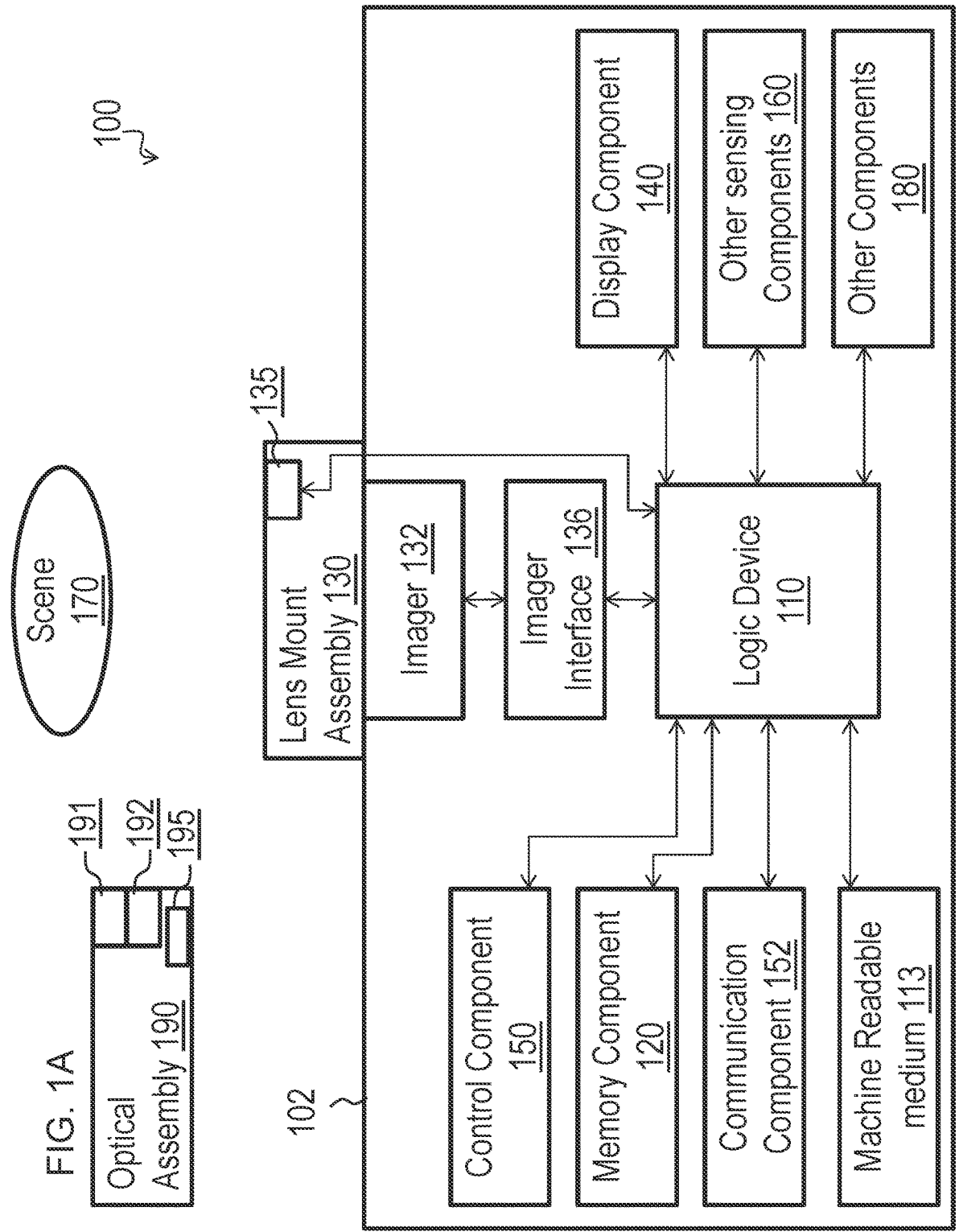
FIG. 1A illustrates a block diagram of an imaging system with a lens mount assembly and detached optical assembly in accordance with an embodiment of the disclosure.
Figure 1B:
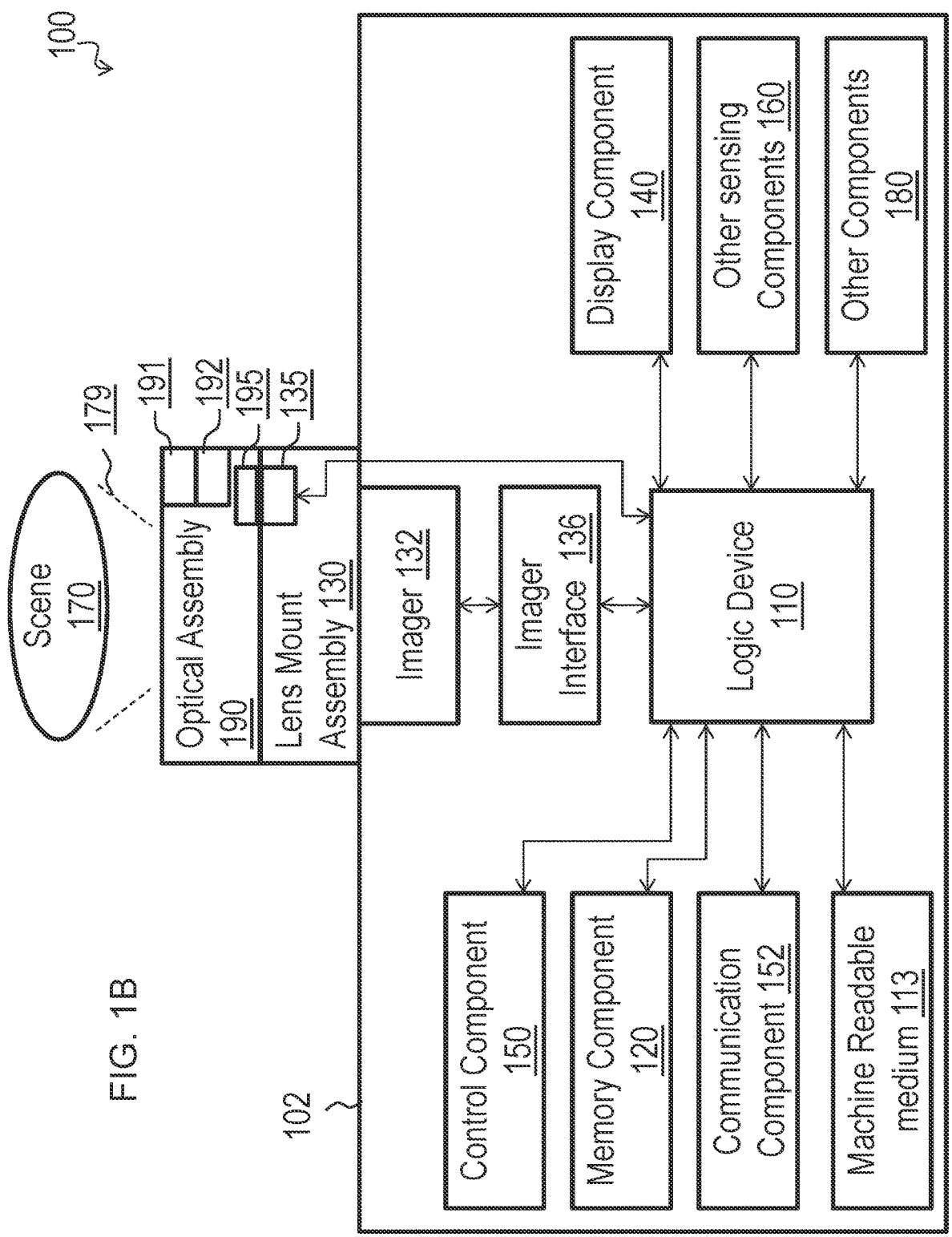
FIG. 1B illustrates a block diagram of an imaging system with a lens mount assembly and attached optical assembly in accordance with an embodiment of the disclosure.

Turning now to the drawings, FIG. 1A illustrates a block diagram of imaging system 100 with lens mount assembly 130 and detached optical assembly 190 and FIG. 1B illustrates a block diagram of imaging system 100 with lens mount assembly 130 and attached optical assembly 190, in accordance with embodiments of the disclosure.

As shown, imaging system 100 comprises an optical assembly 190, lens mount assembly 130, housing 102 (e.g., a camera body), logic device 110, machine readable medium 113, memory 120, display 140, controls 150, communication interface 152, other sensors 160, and other components 180. In various embodiments, imaging system 100 may be implemented, for example, as a camera system such as a portable handheld camera system, a small form factor camera system implemented as part of another device, a fixed camera system, and/or other appropriate implementations.

Lens mount assembly 130 provides mechanical mechanisms for mounting optical assembly 109 and electrical mechanisms, i.e., motorized lens electrical interface 135, for controlling the movement of optical assembly 190 responsive to optical assembly 190 being a motorized lens and including its own electrical mechanisms, i.e., motorized lens electrical interface 195. Accordingly, optical assembly 190 may be selectively attached to and detached from imaging system 100 via lens mount assembly 130. In various embodiments, optical assembly 190 may comprise one or more optical elements (e.g., one or more lenses, filters, transmissive windows, and/or other optical components) that receive infrared radiation 179 from scene 170, which are then passed to be captured by imager 132.

Imager 132 may include an array of sensors (e.g., any type of infrared, visible light, or other types of detectors) for capturing image frames of scene 170. In some embodiments, imager 132 may also include one or more analog-to-digital converters for converting analog signals captured by the sensors into digital data (e.g., pixel values) to provide the captured image frames. Imager interface 136 provides the captured image frames to logic device 110 which may be used to process the image frames, store the original and/or processed image frames in memory 120, and/or retrieve stored image frames from memory 120.

Figure 2:
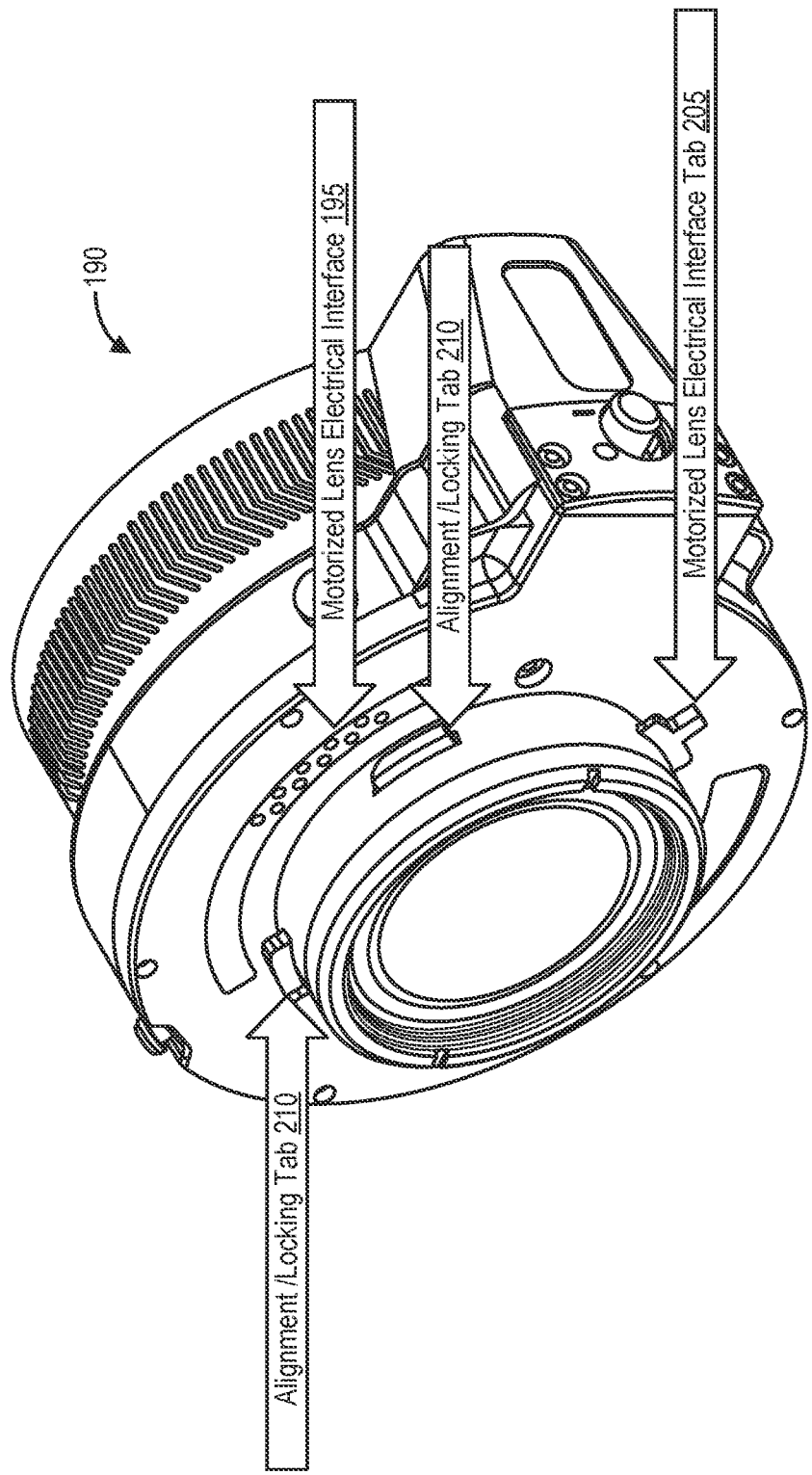
FIG. 2 illustrates one exemplary view of an optical assembly with a motorized lens interface tab and alignment/locking tabs in accordance with embodiments of the disclosure.
Figure 3:
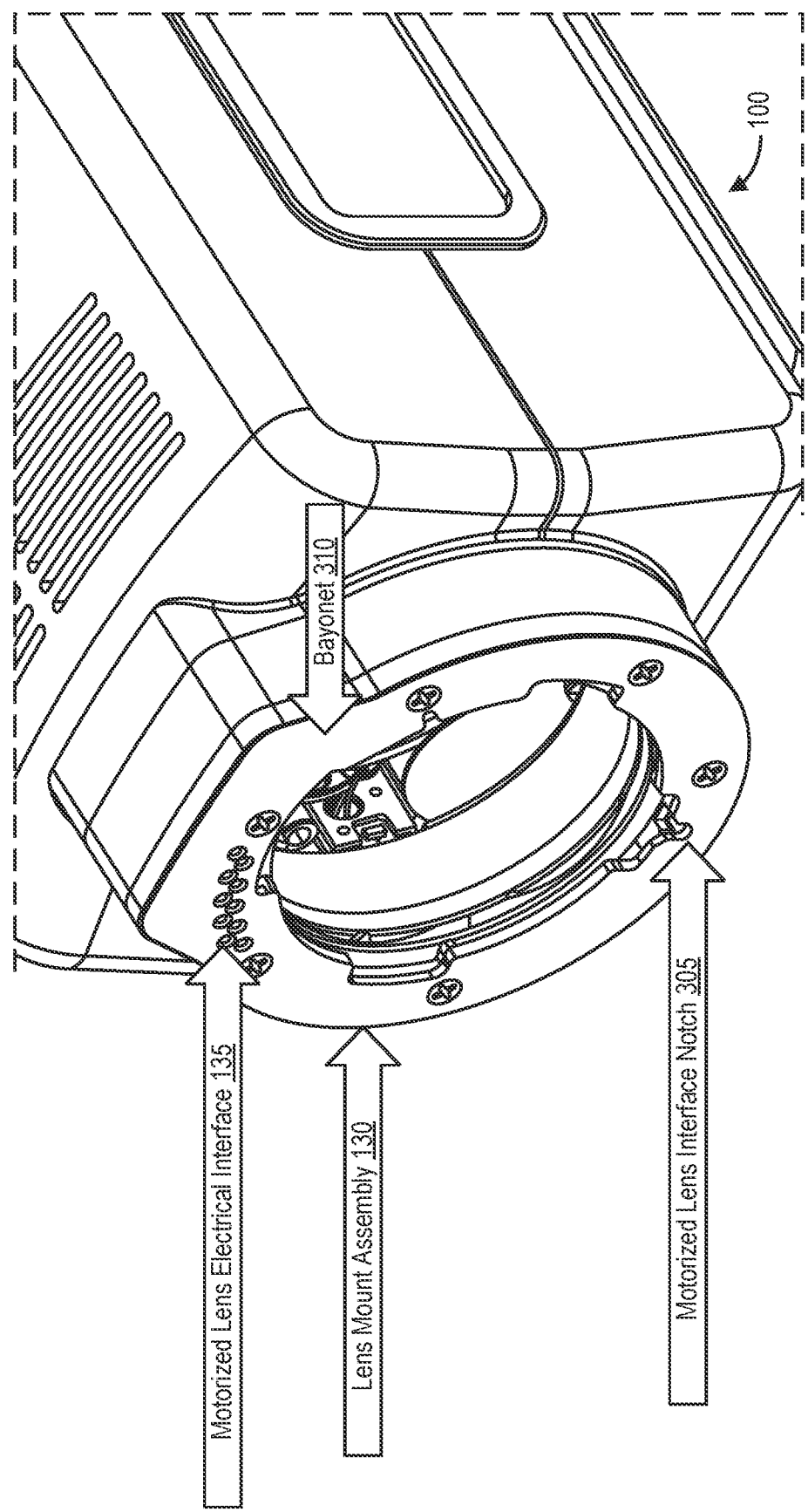
FIG. 3 illustrates one exemplary view of an imaging system with a lens mount assembly, the lens mount assembly comprising a motorized lens interface notch in accordance with embodiments of the disclosure.

In accordance with embodiments of the disclosure, there are two main types of optical assemblies 190, i.e., non-motorized optical assemblies and motorized optical assemblies. The following description focuses on the operation provided by lens mount assembly 130 when optical assembly 190 is a motorized optical assembly that comprises one or more lenses 191 and motor 192 (e.g., for ease of illustration, not shown to scale). Motor 192 may be a focus motor and/or a zoom motor. In order to actuate a motorized lens electrical connection provided by lens mount assembly 130, a motorized optical assembly 190 comprises a motorized lens interface tab. FIG. 2 illustrates one exemplary view of optical assembly 190 with motorized lens interface tab 205 and alignment/locking tabs 210 in accordance with embodiments of the disclosure. FIG. 2 further illustrates motorized lens electrical interface 195 corresponding to motorized lens electrical interface 195 of FIGS. 1A and 1B. In order to for lens mount assembly 130 to receive motorized lens interface tab 205, lens mount assembly 130 comprises a motorized lens interface notch. FIG. 3 illustrates one exemplary view of imaging system 100 with lens mount assembly 130, lens mount assembly 130 comprising motorized lens interface notch 305 in accordance with embodiments of the disclosure. As is illustrated in FIG. 3, motorized lens interface notch 305 is within bayonet member 310 of lens mount assembly 130. FIG. 3 further illustrates motorized lens electrical interface 135 corresponding to motorized lens electrical interface 135 of FIGS. 1A and 1B. A member, as used in conjunction with bayonet member 310 as well as other members described hereafter, may be implemented as a partial or complete ring as shown in some embodiments.

When optical assembly 190 is received into lens mount assembly 130, using a set of alignment/locking notches in bayonet 310, motorized lens interface tab 205 passes through motorized lens interface notch 305 and engages a lifter member of lens mount assembly 130. Thus, when optical assembly 190 is rotated by a user in a direction to a locked position, the motorized lens interface tab 205 actuates an extend/retract mechanism within lens mount assembly 130 such that one or more electrical connections within motorized lens electrical interface 135 of lens mount assembly 130 translate toward and engage one or more complementary electrical connections of motorized lens electrical interface 195 of optical assembly 190.

Figure 4:
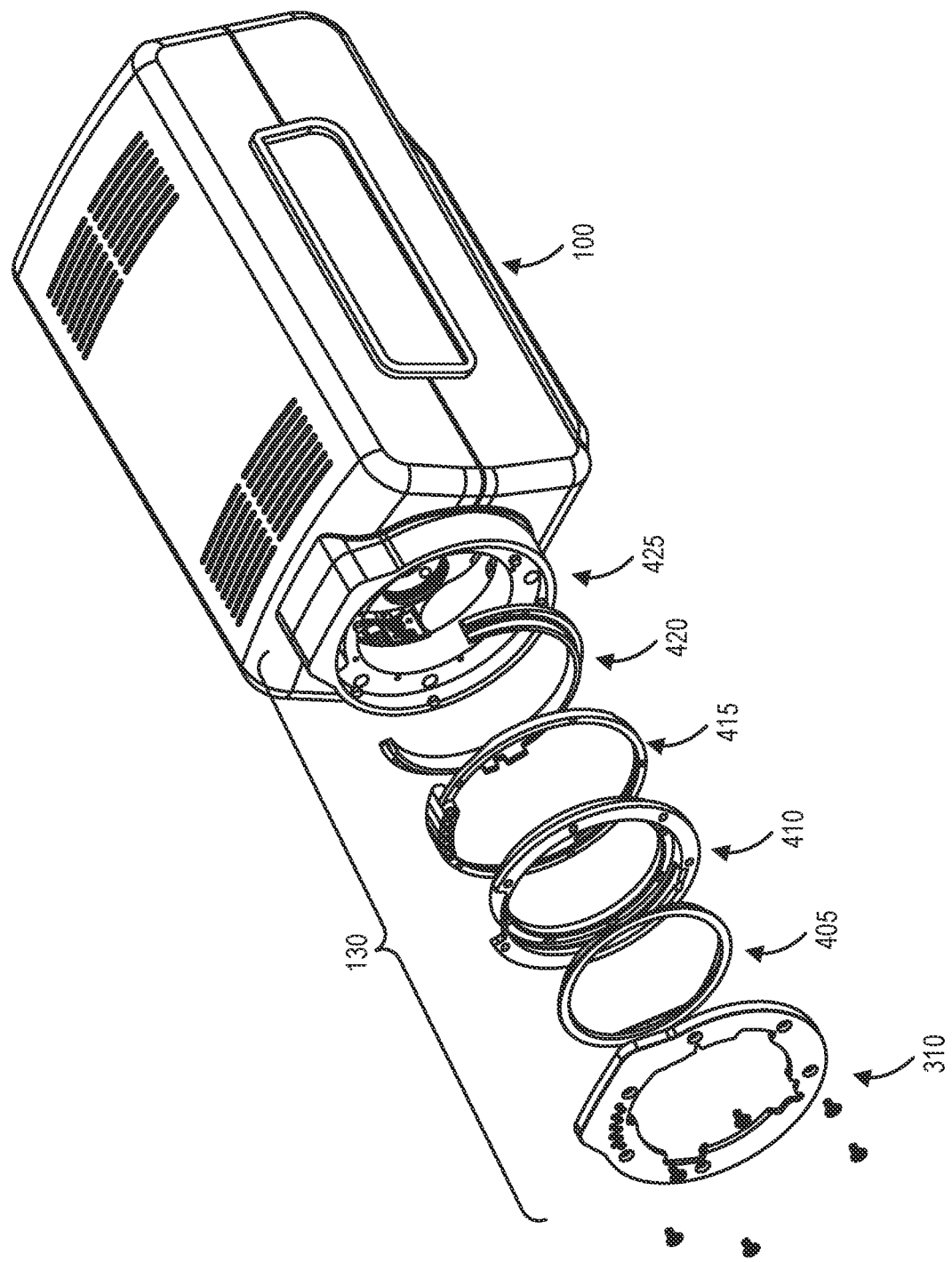
FIGS. 4-6, 7A, 7B, 8A, 8B, and 9-10 illustrate various components of a lens mount assembly in accordance with embodiments of the disclosure.
Figure 5:
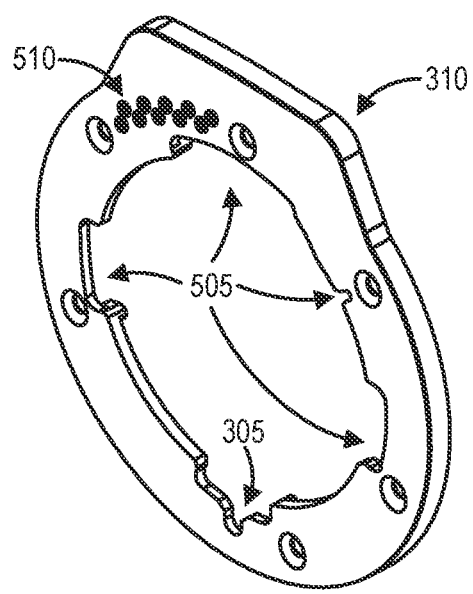
Figure 6:
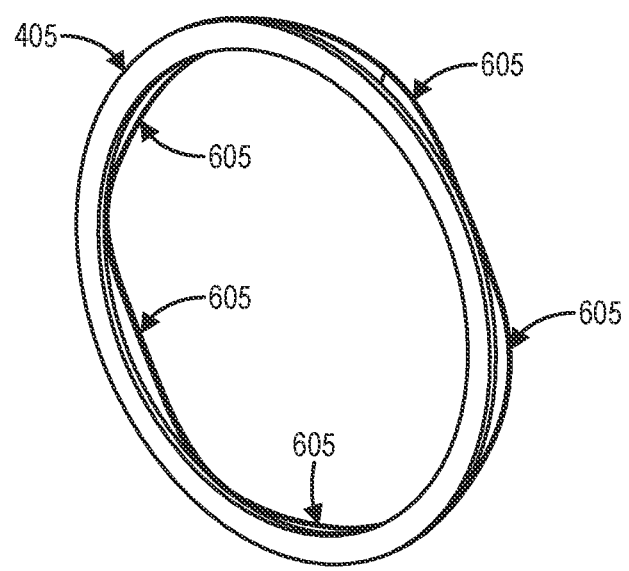

FIGS. 4-10 illustrate various components of lens mount assembly 130 in accordance with embodiments of the disclosure. As is illustrated in FIG. 4, an exploded view of lens mount assembly 130 depicts lens mount assembly 130 comprising bayonet member 310 and bayonet spring member 405, retainer member 410, connector member 415, and lifter member 420, all of which fit within spacer 425 which is coupled to imaging system 100. FIG. 5 illustrates bayonet member 310 that comprises alignment/locking notches 505, motorized lens interface notch 305, and openings 510 for the electrical pins of motorized lens electrical interface 135 in accordance with embodiments of the disclosure. When optical assembly 190 is received into lens mount assembly 130, alignment/locking notches 505 are provided for engaging a plurality of alignment tabs 210 of optical assembly 190. Additionally, when optical assembly 190 is received into lens mount assembly 130, using alignment/locking notches 505 in bayonet 310, motorized lens interface tab 205 passes through motorized lens interface notch 305 and engages a lifter member of lens mount assembly 130. FIG. 6 illustrates bayonet spring member 405 which provides resistance, via spring mechanisms 605, for the insertion of optical assembly 190 into lens mount assembly 130 so that optical assembly 109 mounts snugly within lens mount assembly 130 in accordance with embodiments of the disclosure.

Figure 7A:
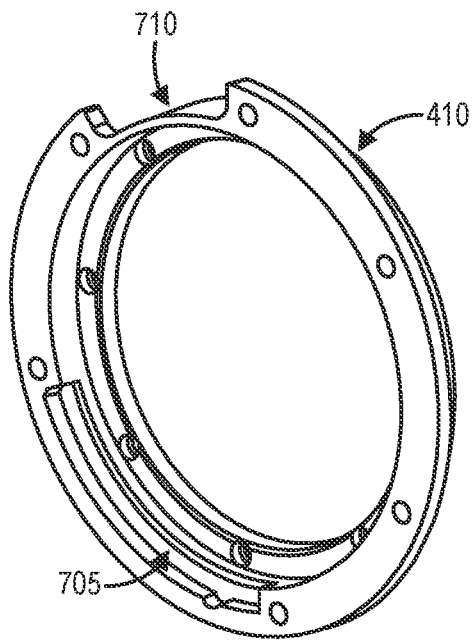
Figure 7B:
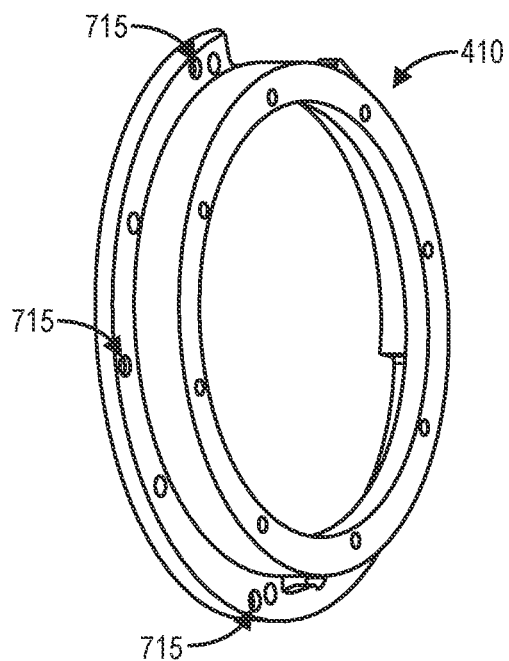

FIGS. 7A and 7B illustrate retainer member 410 that resists the movement of connector member 415 when lifter member 420 bears upon connector member 415 in accordance with embodiments of the disclosure. FIG. 7A illustrates a front face of retainer member 410 and comprises slot 705 in which motorized lens interface tab 205, when inserted through motorized lens interface notch 305, moves when optical assembly 190 is rotated by the user. Once in slot 705, motorized lens interface tab 205 couples to a receiver of lifter member 420, which causes lifter member 420 to rotate thereby bearing upon connector member 415. FIG. 7A additionally illustrates opening 710 that allows for motorized lens electrical interface 135 on connector member 415 to translate when lifter member 420 bears upon connector member 415. FIG. 7B illustrates a rear face of retainer member 410 and comprises indentions 715 in which one side of a set of springs (not shown) positioned between retainer member 410 and connector member 415 reside.

Figure 8A:
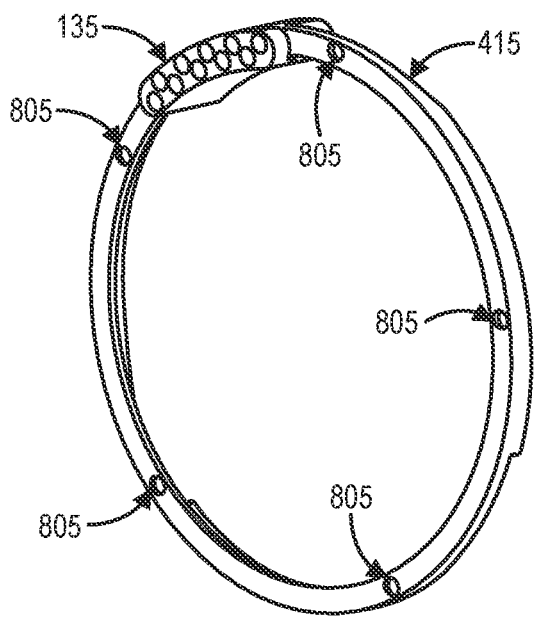
Figure 8B:
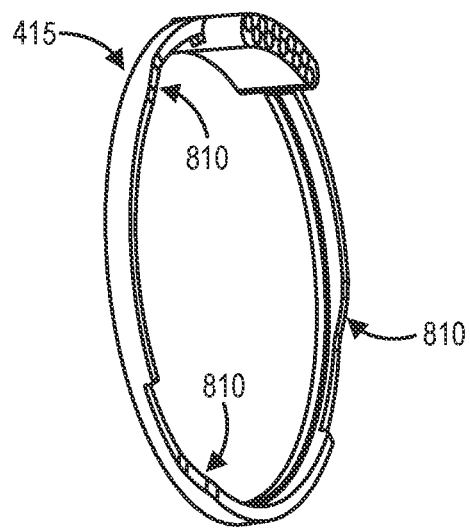

FIGS. 8A and 8B illustrate connector member 415 that translates in directions perpendicular to the rotation of lifter member 420 in accordance with embodiments of the disclosure. FIG. 8A illustrates a front face of connector member 415 and comprises motorized lens electrical interface 135 that provides one or more electrical connections to one or more complementary electrical connections in motorized lens electrical interface 195 of optical assembly 190. That is, when motorized lens interface tab 205 couples to a receiver of lifter member 420 and optical assembly 190 is rotated to a locked position by the user, connector member 415 translates in a direction away from imaging system 100 and one or more electrical connections of motorized lens electrical interface 135 couples to one or more complementary electrical connections of motorized lens electrical interface 195 of optical assembly 190. Similarly, when motorized lens interface tab 205 coupled to the receiver of lifter member 420 is rotated to an unlocked position due to the rotation of optical assembly 190 by the user, connector member 415 translates in a direction toward imaging system 100 and one or more electrical connections of motorized lens electrical interface 135 decouple from the complementary one or more electrical connections of motorized lens electrical interface 195 of optical assembly 190. Also illustrated in FIG. 8A are indentions 805 in which another side of the set of springs (not shown) positioned between retainer member 410 and connector member 415 reside.

FIG. 8B illustrates a rear face of connector member 415 in accordance with embodiments of the disclosure. FIG. 8B illustrates a set of connector member ramp structures 810 that act in conjunction with a set of lifter member ramp structures on lifter member 420. That is, when motorized lens interface tab 205 couples to a receiver of lifter member 420 and the user rotates optical assembly 190 to a locked position, the set of lifter member ramp structures on lifter member 420 bear upon a set of connector member ramp structures 810 thereby translating connector member 415 in a direction away from imaging system 100. Connector member 415 translates in a smooth motion due to the compression of the set of springs (not shown) positioned between retainer member 410 and connector member 415 and extends motorized lens electrical interface 135 outward such that the one or more electrical connections of motorized lens electrical interface 135 couple to the one or more complementary electrical connections of motorized lens electrical interface 195 of optical assembly 190.

Figure 9:
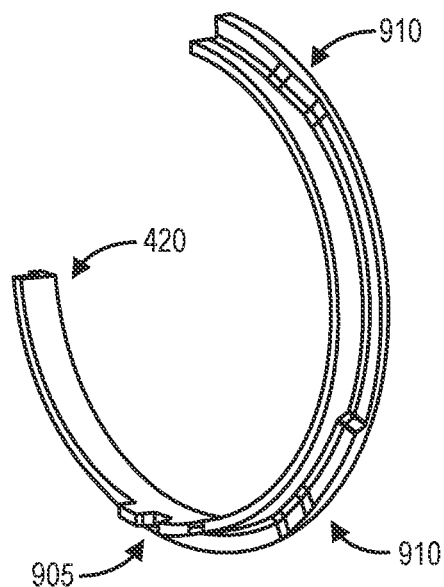
Figure 10:
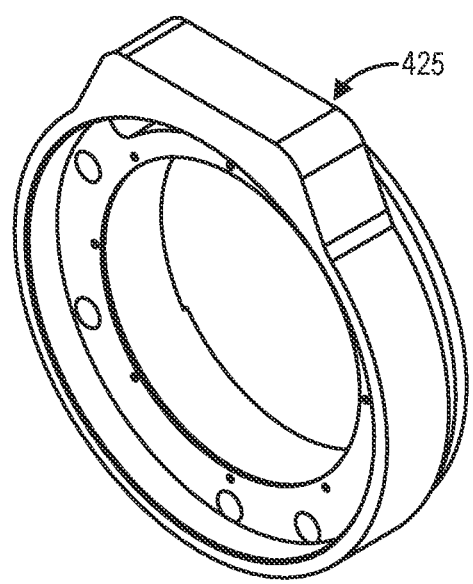

FIG. 9 illustrates a front face of lifter member 420 in accordance with embodiments of the disclosure. Lifter member 420 comprises receiver 905 and the set of lifter member ramp structures 910. When optical assembly 190 is received into lens mount assembly 130, motorized lens interface tab 205 passes through motorized lens interface notch 305 of bayonet member 310 and couples to receiver 905 of lifter member 420. Then, when optical assembly 190 is rotated by a user in a direction to a locked position, the motorized lens interface tab 205/receiver 905 coupling causes the set of lifter member ramp structures 910 to bear upon the set of connector member ramp structures 810 of connector member 415 thereby translating connector member 415 in a direction away from imaging system 100. When optical assembly 190 is rotated by the user in a direction to an unlocked position, the motorized lens interface tab 205/receiver 905 coupling causes the set of lifter member ramp structures 910 to stifle against the set of connector member ramp structures 810 of connector member 415 thereby translating connector member 415 in a direction toward imaging system 100. FIG. 10 illustrates spacer 425 in accordance with embodiments of the disclosure. Spacer 425 provides a space such that bayonet spring member 405, retainer member 410, connector member 415, and lifter member 420 fit in the space when coupled to imaging system 100. Bayonet 310 couples to the face of spacer 425.

Figure 11A:
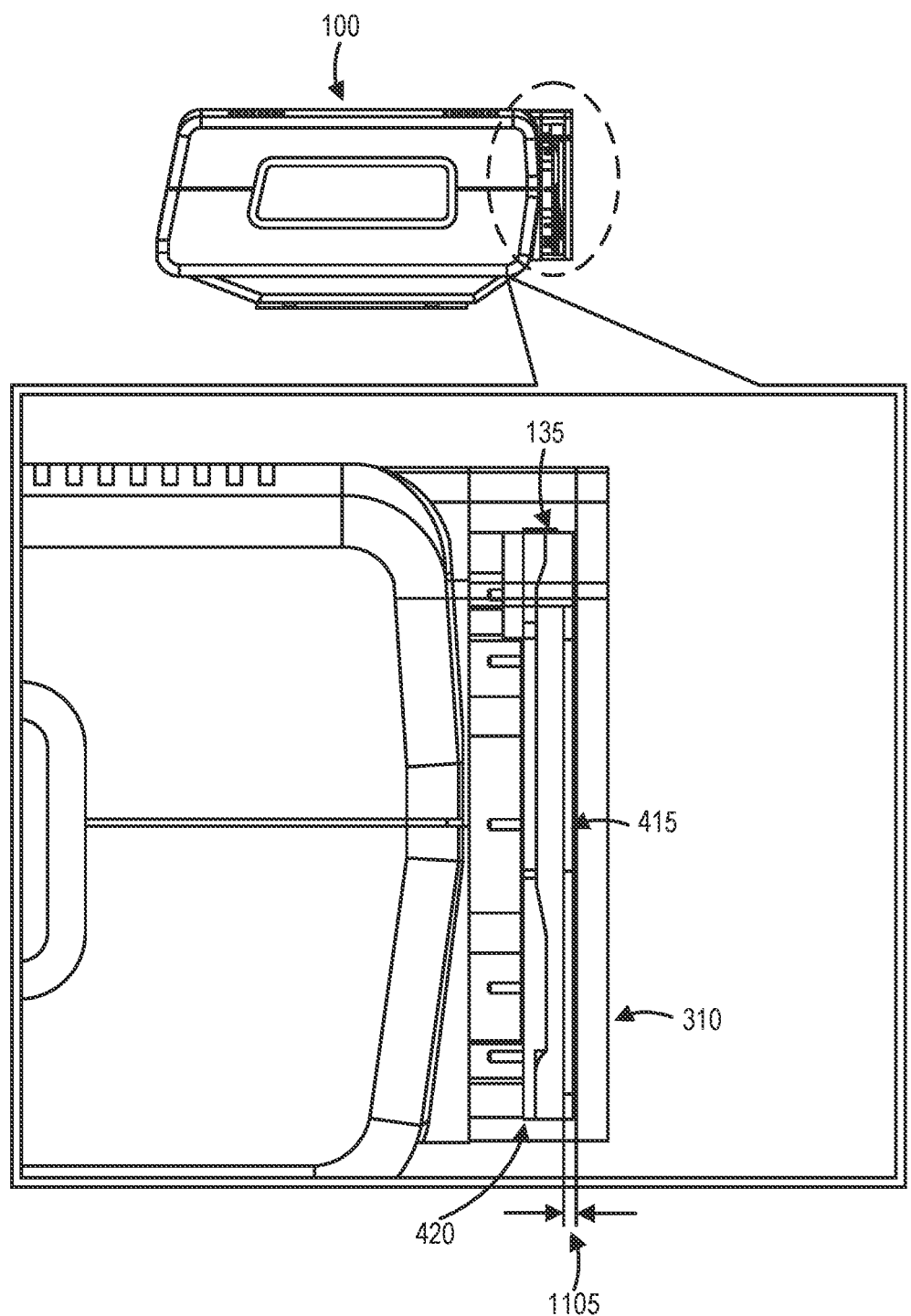
FIGS. 11A and 11B illustrates one example of a connector member in a retracted position and an extended position, respectively, in accordance with embodiments of the disclosure.
Figure 11B:
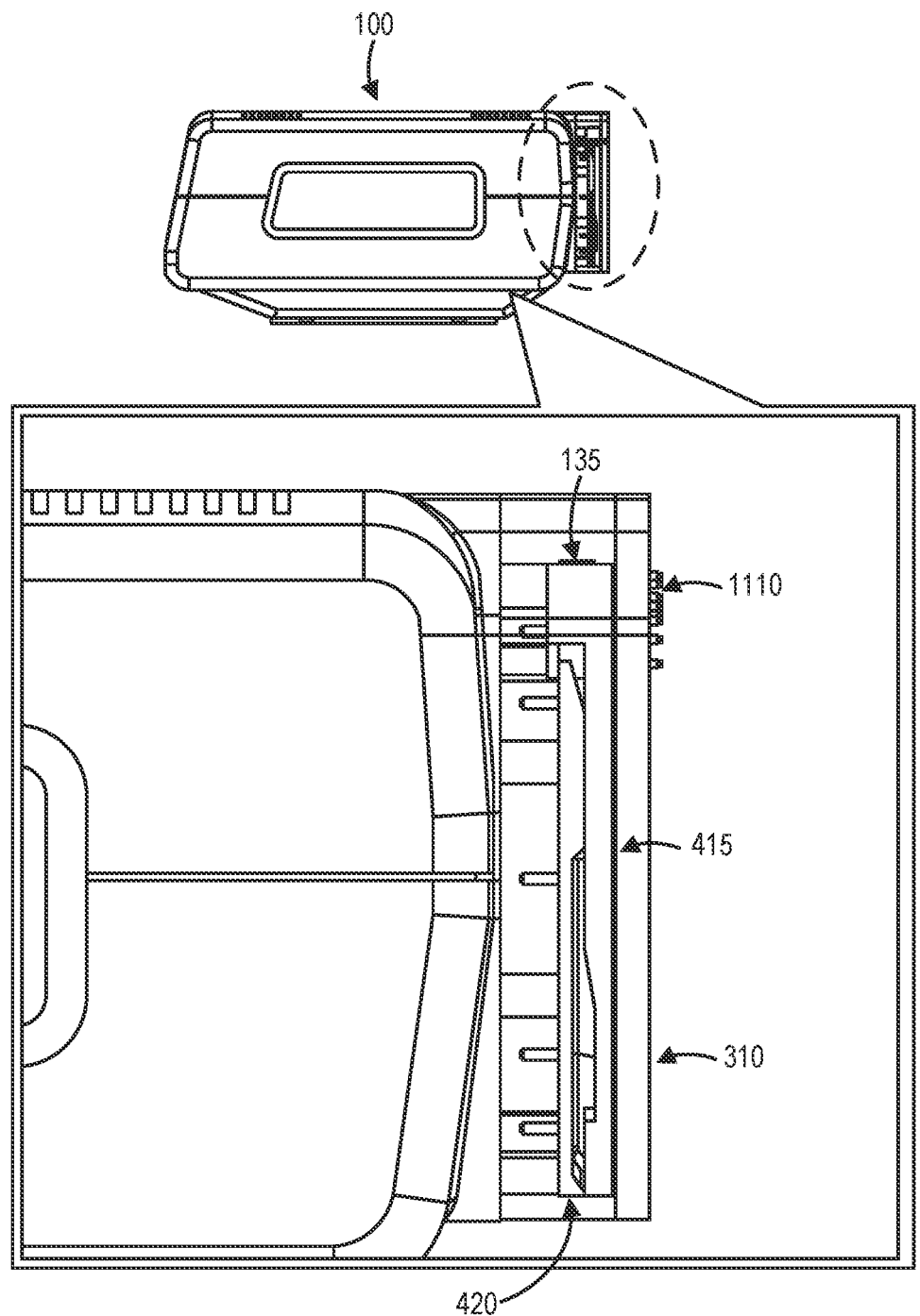
Figure 12:
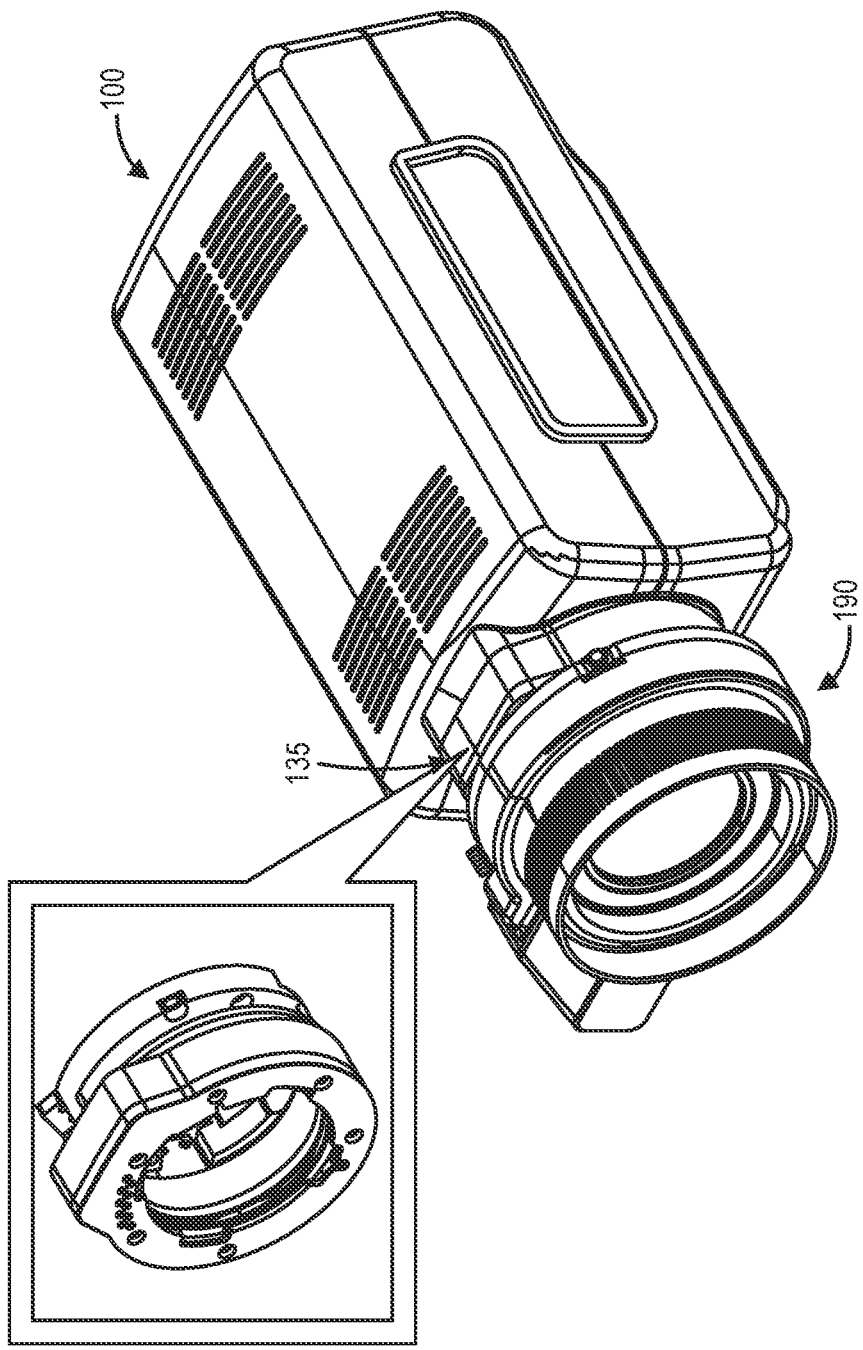
FIG. 12 illustrates an imaging system with an optical assembly attached to a lens mount assembly in accordance with embodiments of the disclosure.

FIGS. 11A and 11B illustrates one example of connector member 415 in a retracted position (FIG. 11A) and an extended position (FIG. 11B) in accordance with embodiments of the disclosure. In FIG. 11A, connector member 415 is in a retracted position illustrated by gap 1105 because lifter member 420 has not be rotated so as to bear upon connector member 415 thereby causing the one or more electrical connections of motorized lens electrical interface 135 on connector member 415 to translate in a direction away from imaging system 100 so as couple to one or more complementary electrical connections of the optical assembly. In FIG. 11B, lifter member 420 has been rotated so as to bear upon connector member 415 thereby causing the one or more electrical connections 1110 of motorized lens electrical interface 135 on connector member 415 to translate in a direction away from imaging system 100 thereby allowing the one or more electrical connections 1110 of motorized lens electrical interface 135 to couple to the one or more complementary electrical connections of the motorized lens electrical interface of the optical assembly. FIG. 12 illustrates an imaging system 100 with an optical assembly 190 attached to lens mount assembly 130 in accordance with embodiments of the disclosure.

Returning to FIGS. 1A and 1B, logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 110 is configured to interface and communicate with the various components of imaging system 100 to perform various method and processing steps described herein. In various embodiments, processing instructions may be integrated in software and/or hardware as part of logic device 110, or code (e.g., software and/or configuration data) which may be stored in memory 120 and/or a machine readable medium 113. In various embodiments, the instructions stored in memory 120 and/or machine readable medium 113 permit logic device 110 to perform the various operations discussed herein and/or control various components of system 100 for such operations.

Memory 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 113 (e.g., a memory, a hard drive, a compact disk, a digital video disk, or a flash memory) may be a non-transitory machine-readable medium storing instructions for execution by logic device 110. In various embodiments, machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information).

Logic device 110 may be configured to process captured image frames and provide them to display 140 for viewing by a user. Display 140 may include a display device such as a liquid crystal display (LCD), an organic light-emitting diode (OLED) display, and/or other types of displays as appropriate to display image frames and/or information to a user of system 100. Logic device 110 may be configured to display image frames and information on display 140. For example, logic device 110 may be configured to retrieve image frames and information from memory 120 and provide image frames and information to display 140 for presentation to a user of system 100. Display 140 may include display electronics, which may be utilized by logic device 110 to display such image frames and information.

Controls 150 may include any desired type of user input and/or interface device having one or more user actuated components, such as one or more buttons, slide bars, knobs, keyboards, joysticks, and/or other types of controls that are configured to generate one or more user actuated input control signals. In some embodiments, controls 150 may be integrated with display 140 as a touchscreen to operate as both controls 150 and display 140. Logic device 110 may be configured to sense control input signals from controls 150 and respond to sensed control input signals received therefrom. In some embodiments, portions of display 140 and/or controls 150 may be implemented by appropriate portions of a tablet, a laptop computer, a desktop computer, and/or other types of devices.

In various embodiments, controls 150 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 160 including, for example, motion sensors (e.g., accelerometers, vibration sensors, gyroscopes and/or others), microphones, navigation sensors (e.g., global positioning system (GPS) sensors), and/or other sensors as appropriate.

Logic device 110 may be configured to receive and pass image frames from optical assembly 190, lens mount assembly 130, additional data from sensors 160, and control signal information from controls 150 to one or more external devices through communication interface 152 (e.g., through wired and/or wireless communications). In this regard, communication interface 152 may be implemented to provide wired communication over a cable and/or wireless communication over an antenna. For example, communication interface 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 152 may include an antenna coupled thereto for wireless communication purposes. In other embodiments, the communication interface 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 180 such as speakers, displays, visual indicators (e.g., recording indicators), vibration actuators, a battery or other power supply (e.g., rechargeable or otherwise), and/or additional components as appropriate for particular implementations.

Although various features of imaging system 100 are illustrated together in FIGS. 1A and 1B, any of the various illustrated components and subcomponents may be implemented in a distributed manner and used remotely from each other as appropriate.

Figure 13:
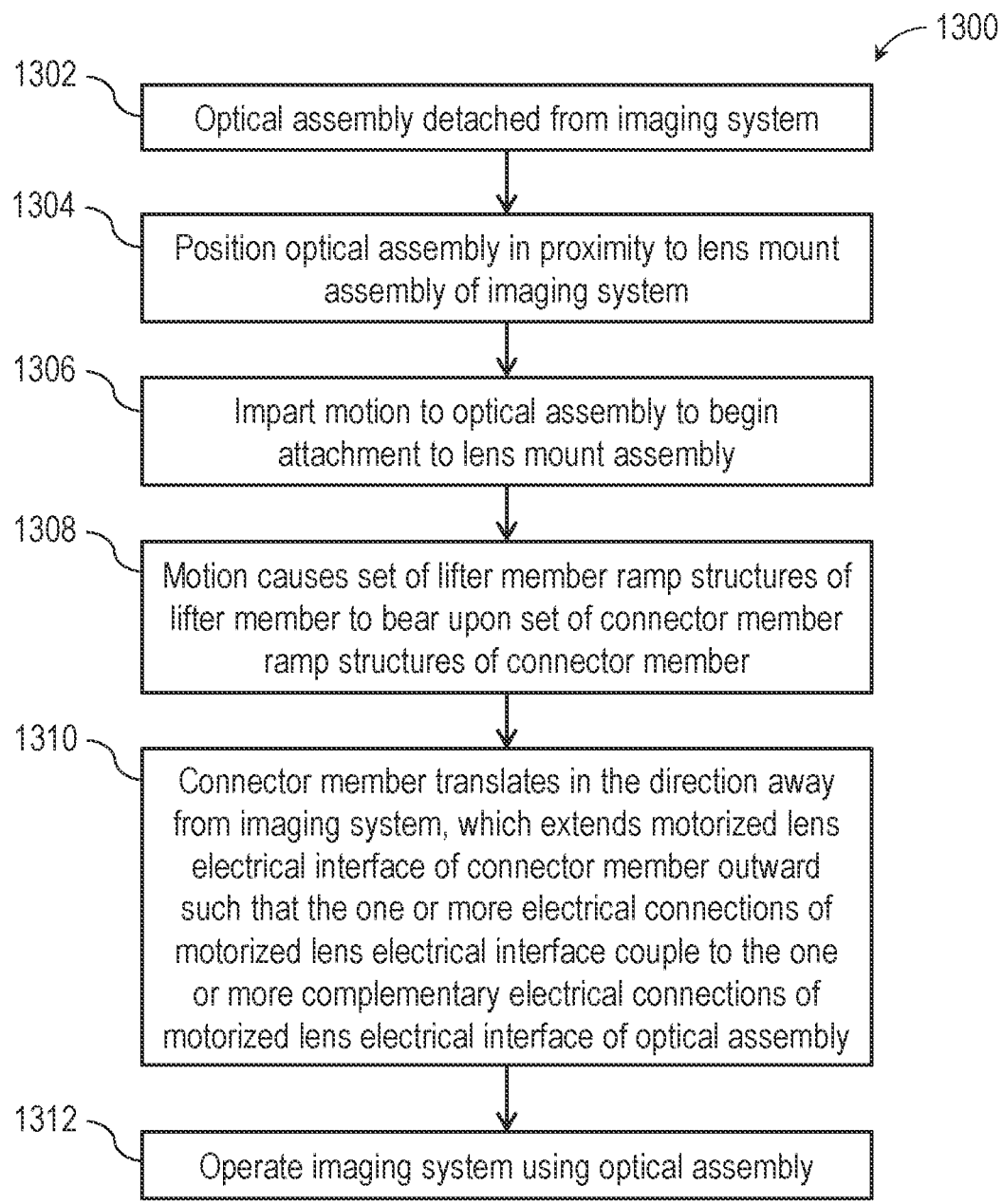
FIG. 13 illustrates a process of attaching a motorized optical assembly to an imaging system in accordance with an embodiment of the disclosure.

FIG. 13 illustrates a process of attaching a motorized optical assembly 190 to imaging system 100 in accordance with an embodiment of the disclosure. In block 1302, optical assembly 190 is initially in a detached state relative to imaging system 100 in the manner illustrated in FIG. 1A.

In block 1304, optical assembly 190 is positioned in proximity to lens mount assembly 130. In various embodiments, a user and/or a machine may manipulate optical assembly 190 to perform the operation of block 1304. For example, optical assembly 190 may be positioned in proximity to lens mount assembly 130 such that motorized lens interface tab 205 of optical assembly 190 passes through motorized lens interface notch 305 of bayonet 310 and couples to receiver 905 of lifter member 420. In various embodiments, a user and/or a machine may manipulate optical assembly 190 to perform the operation of block 1304.

In block 1306, motion is imparted to optical assembly 190 to begin attaching optical assembly 190 to lens mount assembly 130. For example, a user and/or a machine may begin rotating optical assembly 190 in a direction such that the motorized lens interface tab 205/receiver 905 coupling causes lifter member 420 to rotate in a first direction, e.g., clockwise. For example, any appropriate type of rotational motion, linear motion, pressure, and/or other forces may be used in various embodiments.

In block 1308, the rotational motion of optical assembly 190 (e.g., begun in block 1306) causes the set of lifter member ramp structures 910 of lifter member 420 to bear upon the set of connector member ramp structures 810 of connector member 415. For example, as shown in FIGS.

11A and 11B, the rotation of lifter member 420 causes the set of lifter member ramp structures 910 of lifter member 420 to contact and bear upon the set of connector member ramp structures 810 of connector member 415.

In block 1310, due to the set of lifter member ramp structures 910 of lifter member 420 bearing upon the set of connector member ramp structures 810 of connector member 415, connector member 415 translates in the direction away from imaging system 100, which extends motorized lens electrical interface 135 of connector member 415 outward such that the one or more electrical connections of motorized lens electrical interface 135 couple to the one or more complementary electrical connections of motorized lens electrical interface 195 of optical assembly 190.

In block 1312, imaging system 100 is operated with optical assembly 190 in place such that an electrical component, i.e., a focus motor and/or a zoom motor, coupled to motorized lens electrical interface 195 of optical assembly 190 operates based on instructions provided by logic device 110 of imaging system 100. For example, block 1312 may include the selective operation of motor 192 to select a portion of scene 170 and the capturing of images of the selected portion of scene 170 by imager 132.

Figure 14:
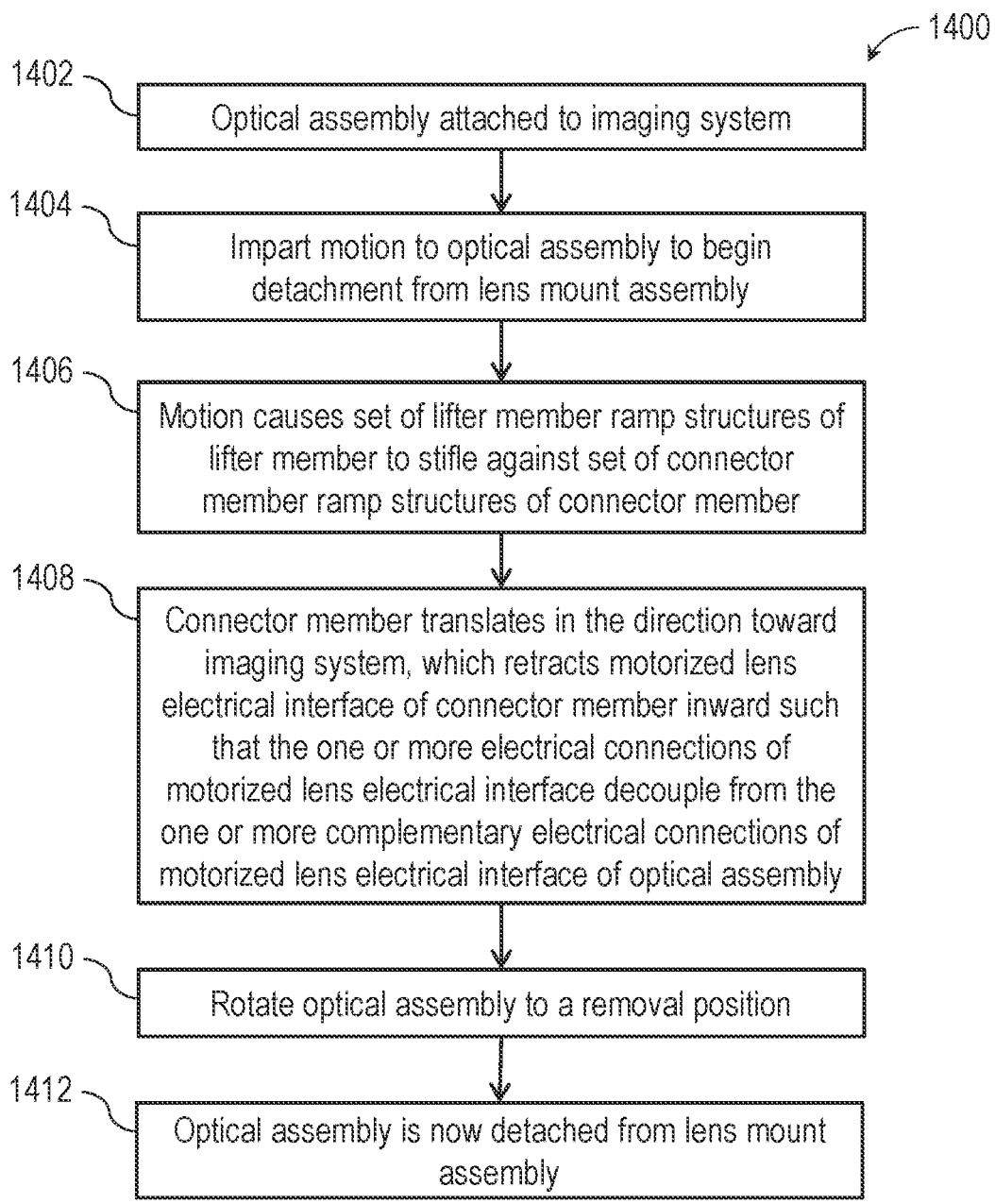
FIG. 14 illustrates a process of detaching a motorized optical assembly from an imaging system in accordance with an embodiment of the disclosure.

FIG. 14 illustrates a process of detaching a motorized optical assembly 190 from imaging system 100 in accordance with an embodiment of the disclosure.

In block 1402, optical assembly 190 is initially in an attached state relative to imaging system 100 in the manner illustrated in FIG. 1B (e.g., following the process of FIG. 13 discussed herein).

In block 1404, motion is imparted to optical assembly 190 to begin detaching optical assembly 190 from lens mount assembly 130. For example, a user and/or a machine may begin rotating optical assembly 190 in a direction such that the motorized lens interface tab 205/receiver 905 coupling causes lifter member 420 to rotate in a second direction, i.e., counterclockwise. For example, any appropriate type of rotational motion, linear motion, pressure, and/or other forces may be used in various embodiments.

In block 1406, the motion of optical assembly 190 (e.g., begun in block 1406) causes the set of lifter member ramp structures 910 of lifter member 420 to stifle against the set of connector member ramp structures 810 of connector member 415.

As a result, in block 1408, due to the set of lifter member ramp structures 910 of lifter member 420 stifling against the set of connector member ramp structures 810 of connector member 415, connector member 415 translates in the direction toward imaging system 100, which retracts motorized lens electrical interface 135 of connector member 415 inward such that the one or more electrical connections of motorized lens electrical interface 135 decouple from the one or more complementary electrical connections of motorized lens electrical interface 195 of optical assembly 190.

In block 1410, optical assembly rotates to a removal position. In block 1412, optical assembly 190 is positioned away from lens mount assembly 130 such that optical assembly is fully detached from lens mount assembly 130. Following the process of FIG. 14, the process of FIG. 13 or 15 may be performed to attach the same or different optical assembly 190 as desired to support different uses of imaging system 100 as desired.

Figure 15:
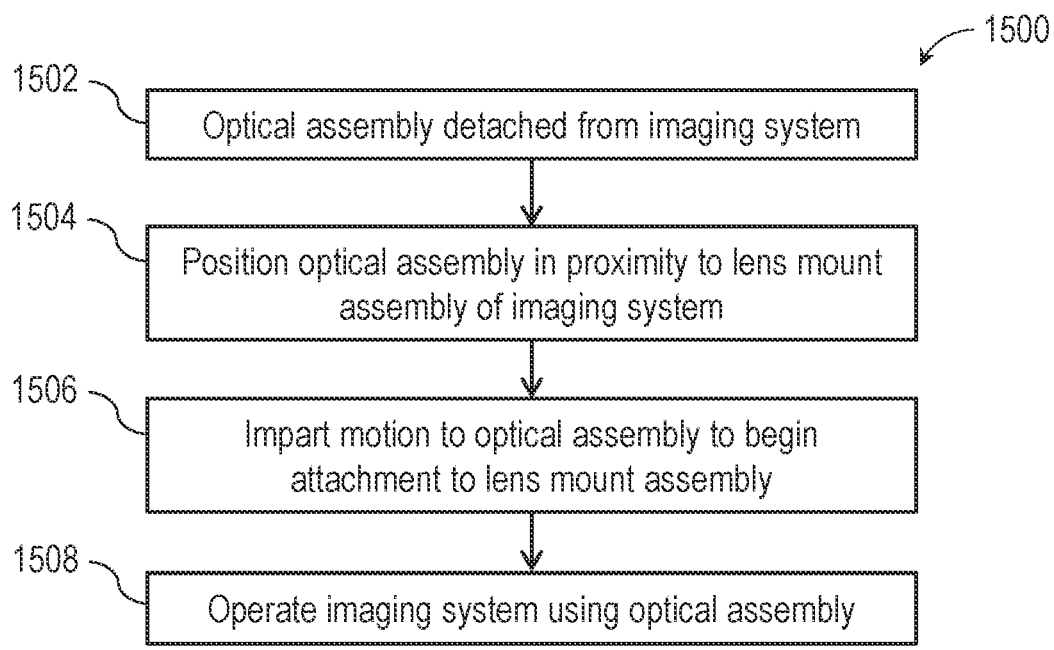
FIG. 15 illustrates a process of attaching a non-motorized optical assembly to an imaging system in accordance with an embodiment of the disclosure.

FIG. 15 illustrates a process of attaching a non-motorized optical assembly 190 to imaging system 100 in accordance with an embodiment of the disclosure. In block 1502, optical assembly 190 is initially in a detached state relative to imaging system 100 in the manner illustrated in FIG. 1A.

In block 1504, optical assembly 190 is positioned in proximity to lens mount assembly 130. In various embodiments, a user and/or a machine may manipulate optical assembly 190 to perform the operation of block 1304. For example, optical assembly 190 may be positioned in proximity to lens mount assembly 130 such that one or more alignment tabs 210 of optical assembly 190 passes through one or more alignment notches 505 of bayonet 310. In various embodiments, a user and/or a machine may manipulate optical assembly 190 to perform the operation of block 1304.

In block 1506, motion is imparted to optical assembly 190 to begin attaching optical assembly 190 to lens mount assembly 130. For example, a user and/or a machine may begin rotating optical assembly 190 in a direction that causes the one or more alignment tabs 210 to rotate in a first direction, e.g., clockwise, to a locked position. For example, any appropriate type of rotational motion, linear motion, pressure, and/or other forces may be used in various embodiments.

In block 1508, imaging system 100 is operated with optical assembly 190 in place based on instructions provided by logic device 110 of imaging system 100. For example, block 1508 may include the capturing of images of scene 170 by imager 132.

Figure 16:
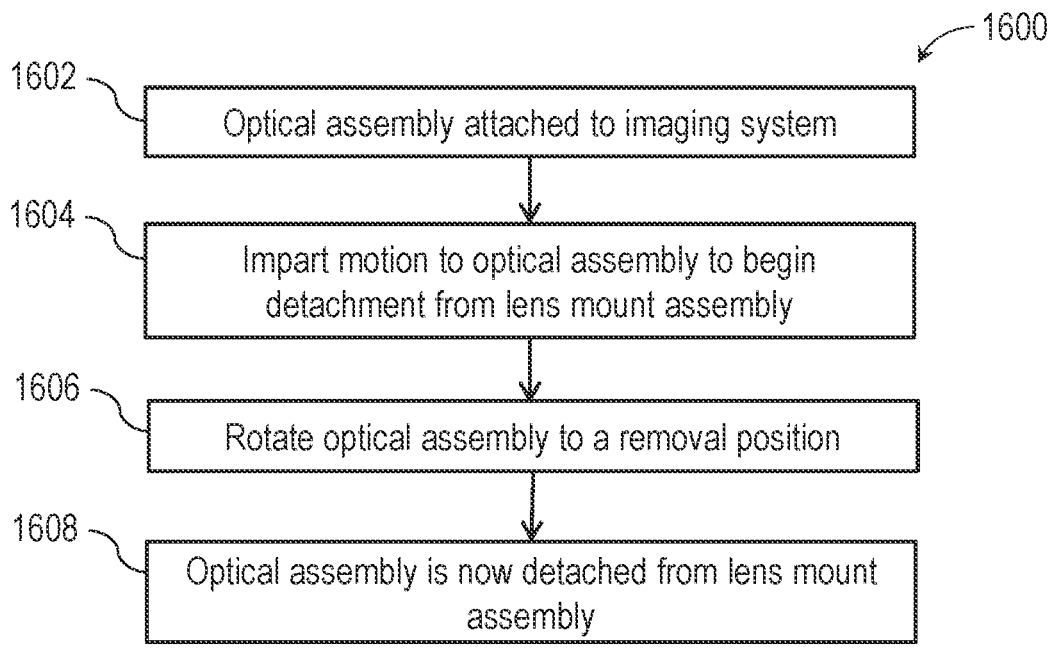
FIG. 16 illustrates a process of detaching a non-motorized optical assembly from an imaging system in accordance with an embodiment of the disclosure.

FIG. 16 illustrates a process of detaching a non-motorized optical assembly 190 from imaging system 100 in accordance with an embodiment of the disclosure.

In block 1602, optical assembly 190 is initially in an attached state relative to imaging system 100 in the manner illustrated in FIG. 1B (e.g., following the process of FIG. 15 discussed herein).

In block 1604, motion is imparted to optical assembly 190 to begin detaching optical assembly 190 from lens mount assembly 130. For example, a user and/or a machine may begin rotating optical assembly 190 in a direction such that the one or more alignment tabs 210 rotate in a second direction, i.e., counterclockwise. For example, any appropriate type of rotational motion, linear motion, pressure, and/or other forces may be used in various embodiments.

In block 1606, optical assembly rotates to a removal position. In block 1608, optical assembly 190 is positioned away from lens mount assembly 130 such that optical assembly is fully detached from lens mount assembly 130. Following the process of FIG. 16, the process of either FIG. 13 or 15 may be performed to attach the same or different optical assembly 190 as desired to support different uses of imaging system 100 as desired.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving an optical assembly at a lens mount assembly of an imaging system;
receiving a rotation of the optical assembly from a first position to a second position to secure the optical assembly to the lens mount assembly;
wherein the lens mount assembly comprises a connector member configured to translate in a direction away from the imaging system in response to the rotation of the optical assembly; and
wherein translation of the connector member away from the imaging system extends one or more electrical connections of the lens mount assembly outward to engage with one or more complementary electrical connections of the optical assembly to couple an electrical component of the optical assembly with the imaging system.

2. The method of claim 1, wherein the lens mount assembly comprises:
a lifter member configured to rotate in response to the rotation of the optical assembly; and
the connector member configured to translate toward the optical assembly in a direction perpendicular to the rotation of the optical assembly in response to rotation of the lifter member, wherein the one or more electrical connections are configured to translate toward the optical assembly with the connector member.

3. The method of claim 2, wherein:
the receiving the optical assembly comprises engaging a tab of the optical assembly with the lifter member; and
the tab is configured to bear upon the lifter member to rotate the lifter member in response to the rotation of the optical assembly.

4. The method of claim 3, wherein the lens mount assembly further comprises a bayonet comprising a notch, wherein the tab is configured to pass through the notch to engage the lifter member.

5. The method of claim 4, wherein the bayonet further comprises a plurality of alignment notches configured to engage a plurality of alignment tabs of the optical assembly.

6. The method of claim 3, wherein the rotation is a first rotation, the method further comprising:
receiving a second rotation of the optical assembly from the second position to the first position, wherein the second rotation causes the one or more electrical connections of the lens mount assembly to translate away from and disengage from the complementary electrical connections of the optical assembly to decouple the electrical component of the optical assembly from the imaging system.

7. The method of claim 6, wherein the optical assembly is a first optical assembly, the method further comprising:
receiving a second optical assembly at the lens mount assembly, wherein the second optical assembly does not include the tab of the first optical assembly;
receiving a third rotation of the second optical assembly from a third position to a fourth position to secure the second optical assembly to the lens mount assembly; and
wherein the electrical connections of the lens mount assembly do not translate in response to the third rotation.

8. The method of claim 2, wherein the lifter member comprises one or more ramp structures configured to bear upon and translate the connector member in response to the rotation of the lifter member.

9. The method of claim 2, wherein translation of the connector member toward the optical assembly causes one or more springs between the connector member and a retainer member of the lens mount assembly to compress.

10. The method of claim 1, wherein the optical assembly is a motorized lens, wherein the electrical component is a focus motor and/or a zoom motor.

11. A system comprising:
an imaging system comprising a lens mount assembly;
an optical assembly configured to be received by the lens mount assembly;
wherein the optical assembly is configured to rotate from a first position to a second position to secure the optical assembly to the lens mount assembly;
wherein the lens mount assembly comprises a connector configured to translate in a direction away from the imaging system in response to the rotation of the optical assembly; and
wherein translation of the connector member away from the imaging system extends one or more electrical connections of the lens mount assembly outward to engage with one or more complementary electrical connections of the optical assembly to couple an electrical component of the optical assembly with the imaging system.

12. The system of claim 11, wherein the lens mount assembly comprises:
a lifter member configured to rotate in response to the rotation of the optical assembly; and
the connector member configured to translate toward the optical assembly in a direction perpendicular to the rotation of the optical assembly in response to rotation of the lifter member, wherein the one or more electrical connections are configured to translate toward the optical assembly with the connector member.

13. The system of claim 12, wherein:
the optical assembly comprises a tab configured to engage with the lifter member; and
the tab is configured to bear upon the lifter member to rotate the lifter member in response to the rotation of the optical assembly.

14. The system of claim 13, wherein the lens mount assembly further comprises a bayonet comprising a notch, wherein the tab is configured to pass through the notch to engage the lifter member.

15. The system of claim 14, wherein the bayonet further comprises a plurality of alignment notches configured to engage a plurality of alignment tabs of the optical assembly.

16. The system of claim 13, wherein the optical assembly is configured to rotate from the second position to the first position to cause the one or more electrical connections of the lens mount assembly to translate away from and disengage from the complementary electrical connections of the optical assembly to decouple the electrical component of the optical assembly from the imaging system.

17. The system of claim 16, wherein the optical assembly is a first optical assembly, the system further comprising:
a second optical assembly configured to be received by the lens mount assembly, wherein the second optical assembly does not include the tab of the first optical assembly;
wherein the second optical assembly is configured to rotate from a third position to a fourth position to secure the second optical assembly to the lens mount assembly; and
wherein the electrical connections of the lens mount assembly do not translate in response to the rotation of the second optical assembly.

18. The system of claim 12, wherein the lifter member comprises one or more ramp structures configured to bear upon and translate the connector member in response to the rotation of the lifter member.

19. The system of claim 12, wherein translation of the connector member toward the optical assembly causes one or more springs between the connector member and a retainer member of the lens mount assembly to compress.

20. The system of claim 11, wherein the optical assembly is a motorized lens, wherein the electrical component is a focus motor and/or a zoom motor.

* * * * *